United States Patent [19]

Föhl

[11] Patent Number: 5,071,194
[45] Date of Patent: Dec. 10, 1991

[54] SAFETY BELT RETRACTOR

[75] Inventor: Artur Föhl, Schorndorf, Fed. Rep. of Germany

[73] Assignee: TRW REPA GmbH, Alfdorf, Fed. Rep. of Germany

[21] Appl. No.: 480,017

[22] Filed: Feb. 14, 1990

[30] Foreign Application Priority Data

Feb. 17, 1989 [EP] European Pat. Off. ........ 89102718.7

[51] Int. Cl.⁵ .................... A62B 35/00; A47C 31/00
[52] U.S. Cl. ............... 297/478; 242/107.4 A
[58] Field of Search ............ 297/478, 480, 475, 474, 297/476; 280/806, 807, 801; 242/107.4 R, 107.4 A, 107.4 B

[56] References Cited

U.S. PATENT DOCUMENTS

| 3,206,137 | 9/1965 | Snyderman . | |
| 4,109,881 | 8/1978 | Fohl | 242/107.4 B X |
| 4,172,568 | 10/1979 | Yamanashi et al. | 297/475 X |
| 4,342,619 | 7/1983 | Fohl | 242/107.4 A X |
| 4,422,594 | 12/1983 | Hönl | 297/478 X |
| 4,736,902 | 4/1988 | Doty | 242/107.4 A |
| 4,834,208 | 5/1989 | Kagami et al. | 280/807 X |

FOREIGN PATENT DOCUMENTS

| 624980 | 3/1963 | Belgium | 297/476 |
| 640688 | 5/1962 | Canada | 297/478 |
| 338187A1 | 10/1983 | Fed. Rep. of Germany . | |
| 1179105 | 5/1959 | France | 297/478 |
| 2216776 | 10/1989 | United Kingdom | 280/806 |

Primary Examiner—Jose V. Chen
Attorney, Agent, or Firm—Tarolli, Sundheim & Covell

[57] ABSTRACT

A safety belt retractor includes a webbing sensitive blocking mechanism for blocking rotation of the belt spool in the belt withdrawal direction. The blocking mechanism includes an inertia disc connected via a coupling pawl and an externally toothed coupling wheel to the control wheel. Relative rotation between the inertia disc and the control wheel results in actuation of the blocking mechanism. When a predetermined centrifugal force is exceeded the coupling pawl comes out of engagement with the external toothing of the coupling wheel. The mass disc is uncoupled from the control wheel, preventing actuation of the blocking mechanism.

9 Claims, 2 Drawing Sheets

SAFETY BELT RETRACTOR

The invention relates to a safety belt retractor comprising a belt spool rotatably mounted in a housing, an at least webbing-sensitive blocking mechanism between housing and belt spool and a release means which includes an actuating lever for the blocking mechanism mounted pivotally on the housing, an internally toothed control ring which is rotatably mounted on the housing and to which the actuating lever is connected, a control pawl which is pivotally mounted on the belt spool and which cooperates with the internal toothing of the control ring, a control wheel which is rotatably mounted on the belt spool and which carries an actuating cam for the control pawl and a mass disc connected to the control wheel.

Safety belt retractors of this type are known in numerous constructions. On sudden webbing withdrawal the control wheel with the mass disc connected thereto remains behind the rotational movement of the belt spool and with its actuating cam presses the control pawl into engagement with the internal toothing of the control ring. The rotational movement of the control ring then coupled to the belt spool leads to pivoting of the actuating lever which in turn activates the blocking mechanism of the belt retractor.

The present invention provides a safety belt retractor wherein an undesired activation of the blocking mechanism in certain situations is avoided.

According to the invention, the internal mass disc is connected to the control wheel via a coupling responsive to centrifugal force, and the coupling on exceeding a predetermined centrifugal force disengages the connection between the mass disc and control wheel. As long as the predetermined centrifugal force which corresponds to a predetermined rotational speed of the belt spool is not exceeded the coupling remains closed so that the mass or inertia disc in non-rotatably connected to the control wheel. Only when a predetermined centrifugal force or rotational speed of the belt spool is exceeded is the mass disc released from the control wheel so that the two can turn relatively to each other.

This configuration according to the invention of the safety belt retractor prevents an undesired activation of the blocking mechanism which can occur in conventional safety belt retractors when the belt spool rotates in the takeup direction with relatively high rotational speed and is then suddenly stopped. Such a situation can occur in safety belt retractors when a relatively large webbing length is withdrawn for example manually from the belt retractor and the webbing then suddenly released so that without any appreciable obstruction it is again coiled onto the belt spool under the action of the retractor spring. In particularly freely movable and low-friction safety belt systems the belt spool in such a situation can reach a high speed of rotation until the webbing is coiled up and the belt spool then suddenly retarded. The mass disc coupled to the control wheel tends however to continue the rotational movement so that the control wheel is also turned relatively to the belt spool. The relative rotation then occurring between the belt spool and control wheel corresponds to the same relative rotation which leads to a webbing-sensitive release of the blocking mechanism. As a result, after the abrupt retardation of the belt spool the blocking mechanism may be activated. Such an activation of the blocking mechanism is undesired because at least it prevents the fastening of the safety belt. In conventional safety belt retractors this undesired activation of the blocking mechanism was nevertheless put up with because the possibility existed of inactivating the blocking mechanism in that the webbing is pulled and the webbing length liberated by tightening of the webbing coil is coiled up again, this always leading to inactivation of the blocking mechanism.

In the safety belt retractor constructed according to the invention however the mass disc is prevented from reaching a high rotational speed because at a predetermined speed of rotation of the control wheel it is uncoupled from the latter.

The use of a safety belt retractor according to the invention is particularly advantageous in a safety belt restraining system in which a vertical adjuster for the upper deflection fitting of the shoulder belt is disposed above the safety belt retractor and the vertical adjustment of the deflection fitting is coupled in constrained manner to the longitudinal adjustment of the associated vehicle seat. If in such a restraining system a conventional safety belt retractor is used and an unintentional activation of the blocking mechanism occurs an attempt to effect a longitudinal adjustment of the vehicle seat can lead to damage because a seat adjustment rearwardly leads to an upward movement of the deflection fitting and this is however only possible when webbing can be withdrawn from the belt spool. When the blocking mechanism is activated all the parts of the adjusting mechanism are subjected to extremely high loads.

The construction of the safety belt retractor according to the invention is however also advantageous when the safety belt retractor is combined with a tightening means which in the activated state engages the belt spool. When the tightening mechanism is activated the rotation of the belt spool in the takeup direction takes place with extremely high rotational speed. The construction according to the invention avoids the mass disc reaching similarly high speeds of rotation which towards the end of the tightening operation would lead to difficultly manageable inertial forces.

According to an advantageous embodiment of the invention which is distinguished by its simplicity and a low number of parts required for the coupling operating in dependence upon centrifugal force the mass disc is rotatably mounted on a hub of the control wheel and the hub comprises an extension on which a first form-locking part of the coupling is non-rotatably disposed whilst a second form-locking part of the coupling cooperating with the second is mounted on the mass disc. The two coupling parts are advantageously formed as externally toothed coupling wheel and pawl mounted eccentrically on the mass disc.

Further features and advantages of the invention will be apparent from the description of several embodiments of the invention and from the drawings to which reference is made and in which.

Figure 1:
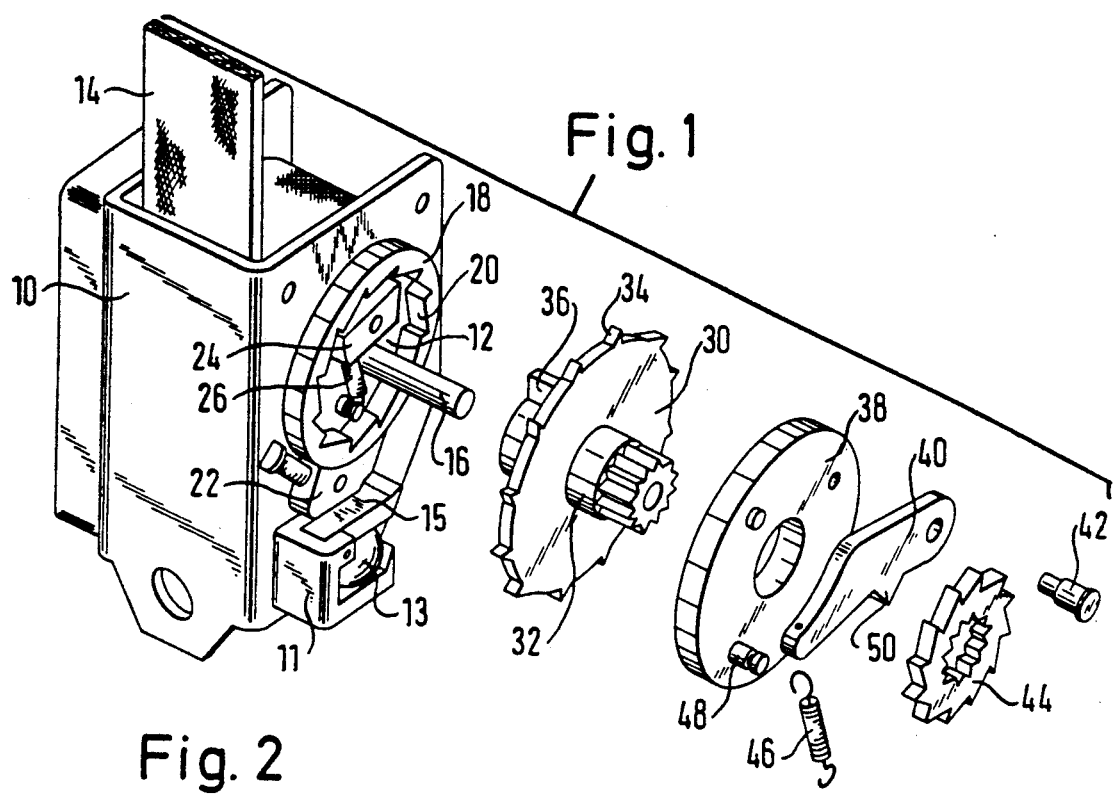
FIG. 1 is a perspective view of a first embodiment of the safety belt retractor in partially exploded view.

In the housing 10 of the safety belt retractor shown in FIG. 1 a belt spool is rotatably mounted on which the webbing 14 is coiled. The belt spool 12 comprises on one side a shaft-like extension 16. On the same side a control ring 18 is rotatably mounted on the one outer side of the housing 10. The control ring 18 is provided with an internal toothing 20. An actuating lever 22 is fixedly connected to the control ring 18. Furthermore, a control pawl 24 is pivotally mounted on the same side of the belt spool 12. The control pawl 24 is held by a pressure spring 26 in a rest position out of engagement with the internal toothing 20. The actuating lever 22 cooperates with a conventionally constructed blocking or ratchet mechanism which is arranged between the housing 10 and belt spool 12. A control wheel 30 is rotatably mounted by means of a hub 32 on the shaft-like extension 16 of the belt spool 12. The control wheel carries at its outer periphery a control toothing 34. The hub 32 carries on its side facing the belt spool and actuating cam 36 which cooperates with the control pawl 24. A mass disc 38 is rotatably mounted on the hub 32. On the one side face of the mass disc 38 a coupling pawl 40 is mounted eccentrically pivotally on a pin 42. A coupling gear 44 provided with an outer toothing is rotatably mounted on the end of the hub 32 remote from the actuating cam 36. A tension spring 46 attached between the free end of the coupling pawl 40 and a pin 48 on the side face of the mass disc 38 acts on the coupling tooth 50 of the coupling pawl 40 in engagement with the outer toothing of the coupling gear 44.

The coupling pawl 40 and the coupling gear 44 form a coupling by which the mass disc 38 is non-rotatably connected to the control wheel 30 as long as the coupling tooth 50 is in engagement with the outer toothing of the coupling gear 44. Since the coupling pawl 40 is eccentrically mounted on the mass disc 38, on increasing speed of the coupling pawl 40 a centrifugal force opposes the tension spring 46. When the centrifugal force has reached a predetermined value it overcomes the force of the tension spring 46 so that the coupling tooth 50 comes out of engagement with the outer toothing of the coupling gear 44. The mass disc 38 is then uncoupled from the control wheel 30. This consequently avoids the mass disc 38 reaching an undesirably high speed of rotation and on abrupt retardation of the belt spool inertial forces which would cause an undesirable activation of the blocking mechanism being transferred from the mass disc 38 to the actuating cam 36.

In known manner a vehicle-sensitive release mechanism cooperates with the outer toothing 34 of the control wheel 30 and is denoted in FIG. 1 by the reference numeral 11 and includes a release pawl 15 pivotally mounted on the housing and bearing on a mass ball 13.

Figure 4:
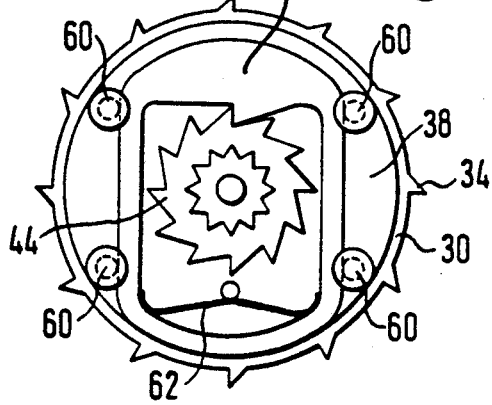
FIGS. 4 and 5 show two further embodiments of a coupling of the safety belt retractor in side elevation.

Differing from the embodiment described above, in the embodiment shown in FIG. 4 the coupling pawl 40A is not pivotal but is mounted translationally displaceably in the radial direction and at the same time however eccentrically on the side of the mass disc 38. The translational movement of the coupling pawl 40A is guided with low friction by four collar bolts 60. The coupling pawl 40A is urged by a leaf spring 62 into its engagement position with the outer toothing of the coupling gear 44.

Figure 2:
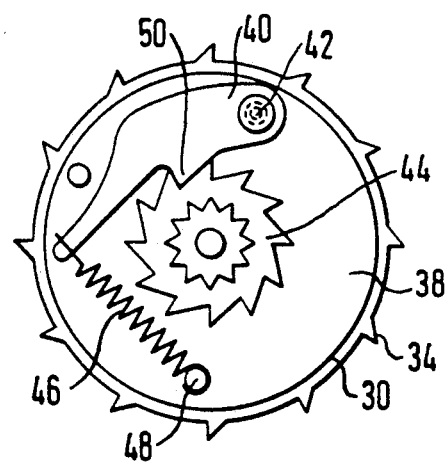
FIG. 2 is a schematic side elevation of the coupling of the embodiment shown in FIG. 1.
Figure 3:
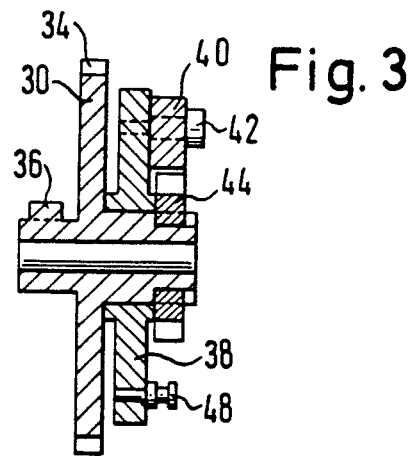
FIG. 3 is a sectional view of the coupling shown in FIG. 2.
Figure 5:
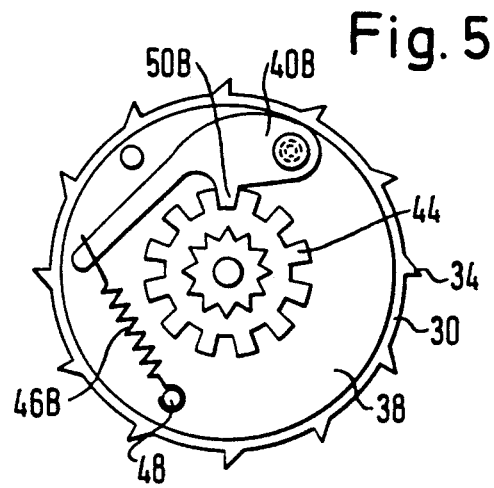

In the embodiment shown in FIG. 5 the teeth of the outer toothing of the coupling gear 44 have a trapezoidal form as does the coupling tooth 50B of the coupling pawl 40B. In this embodiment the tension spring 46B can be made of substantially weaker dimensions than in the embodiment according to FIGS. 1 to 3. On the other hand, with the configuration of the toothing according to FIGS. 1 to 4 a freewheel action can be achieved between the mass disc 38 and the control wheel 30.

Figure 6:
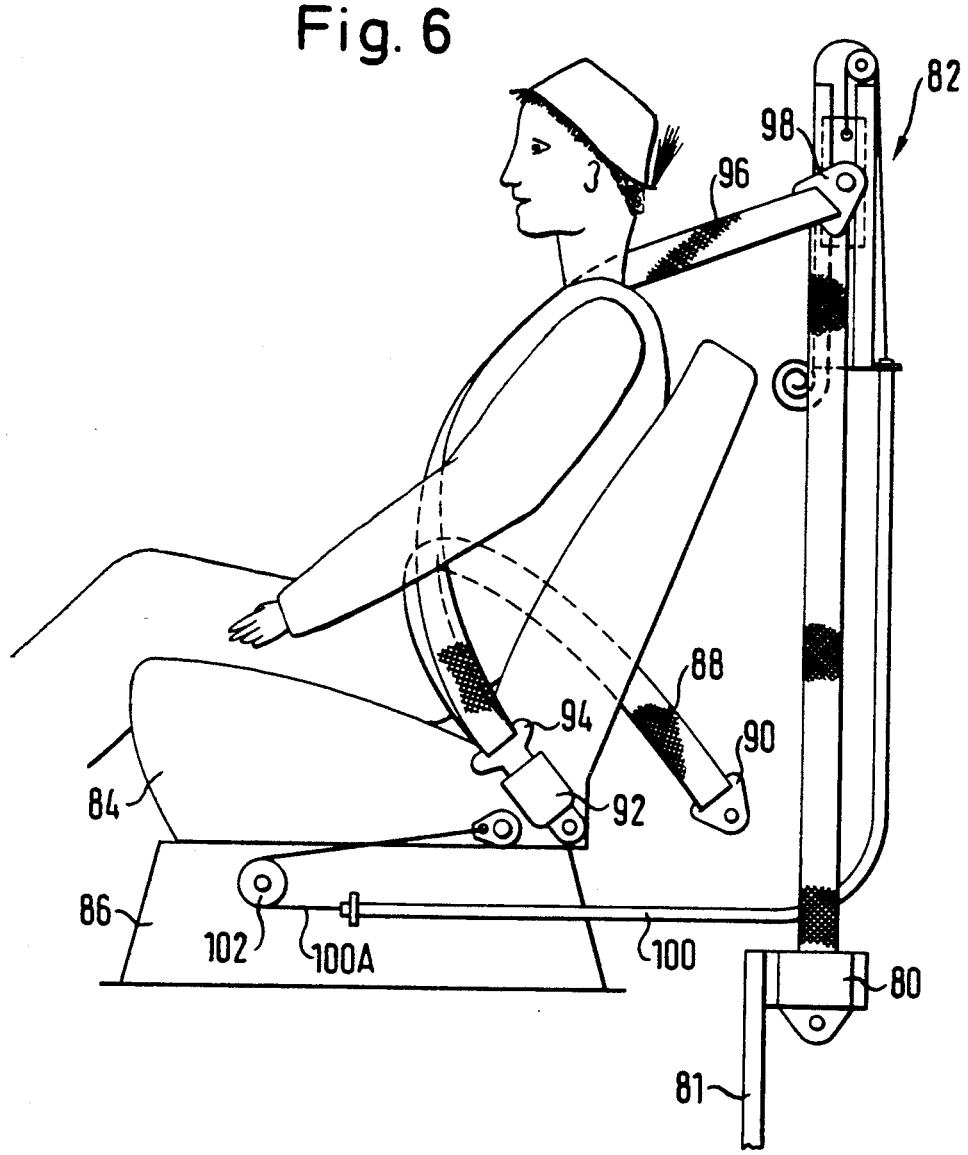
FIG. 6 is a schematic illustration of a safety belt restraining system with vertical adjuster for a deflection fitting and safety belt retractor constructed according to the invention.

In the safety belt restraining system shown schematically in FIG. 6 a safety belt retractor 80 of the type described above is arranged substantially vertically beneath a vertical adjuster which is denoted generally by 82. The vertical adjuster 82 is coupled in constrained manner to a longitudinally adjustable vehicle seat 84. The vehicle seat 84 is longitudinally displaceable in known manner on a guide member 86 fixed to the bodywork and can be arrested in the various longitudinal positions. The waist belt 88 extends between a bodywork-fixed anchoring fitting 90 and a lock fitting to which a belt lock 92 is secured into which an insert tongue 94 is inserted. The shoulder belt 96 runs between the insert tongue 94 and an upper deflection fitting 98. Said upper deflection fitting 98 is anchored to a vertically adjustable slide. Said slide is coupled via a sheathed cable 100 to the vehicle seat 84. The sheathed cable 100A engages at its one end on the slide of the vertical adjuster 82 and at its other end, which is led over a guide pulley 102, on the vehicle seat 84. The safety belt retractor 80 not only has the peculiarities described above but is also equipped with a tightening means 81 which in the activated state engages the belt spool of the safety belt retractor.

When in the system shown in FIG. 6 the user of the safety belt grips the shoulder belt 96, withdraws webbing from the safety belt retractor 80 and then suddenly releases the webbing, the latter is coiled onto the belt spool by the takeup spring present in the interior of the safety belt retractor 80. In this operation the belt spool can reach a relatively high speed of rotation. The control wheel 30 and the mass disc 38 (FIG. 1) follow this rotational movement but at a predetermined speed of rotation the mass disc 38 is uncoupled from the control wheel 30 because the coupling pawl 40 due to the centrifugal forces acting thereon moves out of the external toothing of the coupling gear 44. It is thus avoided that towards the end of the retraction operation when the belt spool is abruptly retarded the control wheel 30 is further rotated and via its actuating cam 36 moves the control cam 24 into engagement with the internal toothing of the control ring 18 to activate the blocking mechanism via the actuating lever 22. The mass disc 38 is also uncoupled from the control wheel 30 on activation of the tightening means 81, when the belt spool is likewise turned in the takeup direction and can reach very high speeds of rotation. Thus, both an overloading of the release mechanism by excessive inertial forces of the mass disc 38 and an undesired activation of the blocking mechanism are avoided. In the system shown in FIG. 6 an undesired activation of the blocking mechanism would jeopardise the drive system for the seat adjustment and the vertical adjustment. This danger is however avoided by the construction of the safety belt retractor according to the invention. It is to be pointed out here that the safety belt retractor 80 according to the invention also when combined with a tightening means 81 engaging the belt spool ensures undelayed and reliable activation of the blocking mechanism after completed tightening. Although at this instant the mass disc 38 is uncoupled from the control wheel because the coupling responsive to centrifugal force disengages the connection in the initial phase of the tightening operation, the control wheel 30 in the tightening still reaches such a high speed that the mass inertia of the control wheel 30 alone, even when it is made from lightweight plastic, suffices for reliable activation of the blocking mechanism.

I claim:

1. A safety belt retractor comprising a belt spool rotatably mounted in a housing, a webbing-sensitive blocking mechanism for blocking said belt spool against rotation in a webbing withdrawal direction and a release means which includes:
    an actuating lever associated with said blocking mechanism and mounted pivotally on said housing;
    an internally toothed control ring which is rotatably mounted on said housing and to which said actuating lever is connected;
    a control pawl which is pivotally mounted on said belt spool and which cooperated with said internal toothing of said control ring;
    a control wheel which is rotatably mounted on said belt spool and which carrier an actuating cam for said control pawl;
    an inertial mass disc connected to said control wheel; and
    a drive between said control wheel and said inertial mass disc for driving said inertial mass disc, said drive including a coupling responsive to centrifugal forces which releasably couples said inertial mass disc for rotation with said control wheel, said coupling on exceeding a predetermined centrifugal force disengaging said inertial mass disc from rotation with said control wheel.

2. The safety belt retractor according to claim 1, wherein said inertial mass disc is rotatably mounted on a hub of said control wheel, said hub comprising an extension on which a first member of said coupling is non-rotatably mounted and said inertial mass disc carrying a second member of said coupling, said first and second coupling members being selectively engageable with each other.

3. The safety belt retractor according to claim 2, wherein said first coupling member is formed by a coupling wheel provided at its outer periphery with detent elements and said second coupling member is formed by a pawl.

4. The safety belt retractor according to claim 3, wherein said pawl is pivotally and eccentrically mounted on said inertial mass disc.

5. The safety belt retractor according to claim 3, wherein said pawl is urged by a spring into engagement with said detent elements of said coupling wheel.

6. The safety belt retractor according to claim 3, wherein said detent elements form a toothing which permits a free-wheeling effect between said first and second coupling members.

7. The safety belt retractor according to claim 1, wherein said control wheel is provided at its outer periphery with control teeth which cooperate with a vehicle-sensitive inertia sensor via a control pawl pivotally mounted on said housing.

8. The safety belt retractor according to claim 1, wherein said retractor is integrated into a safety belt restraining system in which a vertical adjuster for an upper deflection fitting of a shoulder belt is arranged above the safety belt retractor and the vertical adjustment of said deflection fitting is coupled in constrained manner to a longitudinal adjustment of an associated vehicle seat.

9. The safety belt retractor according to claim 1, wherein a safety belt pretensioner is provided which, when activated, engages the belt spool.

* * * * *